United States Patent [19]
Bickford

[11] 4,333,351
[45] Jun. 8, 1982

[54] METHOD AND APPARATUS FOR MEASURING THE RESIDUAL TENSION IN A STUD OR A BOLT

[75] Inventor: John H. Bickford, Middletown, Conn.

[73] Assignee: Raymond Engineering Inc., Middletown, Conn.

[21] Appl. No.: 124,301

[22] Filed: Feb. 25, 1980

[51] Int. Cl.³ .............................................. F16B 31/02
[52] U.S. Cl. ..................................................... 73/761
[58] Field of Search ................ 73/761, 789, 791, 597, 73/826

[56] References Cited

U.S. PATENT DOCUMENTS

| | | | |
|---|---|---|---|
| 3,382,709 | 5/1968 | Sorensen | 73/791 |
| 3,759,090 | 9/1973 | McFaul et al. | 73/761 |
| 3,969,960 | 7/1976 | Pagano | 73/761 |

*Primary Examiner*—Anthony V. Ciarlante
*Attorney, Agent, or Firm*—Fishman & Van Kirk

[57] ABSTRACT

A method and apparatus for determining the residual force or tension in a bolt or stud is presented. The bolt or stud in a previously tightened joint is stressed by the imposition of a pulling force, the resulting strain on the bolt is measured to develop a force-strain relationship, and the measured force-strain relationship is compared to previously determined force-strain relationships for the joint to determine the residual force or tension in the bolt or stud.

6 Claims, 6 Drawing Figures

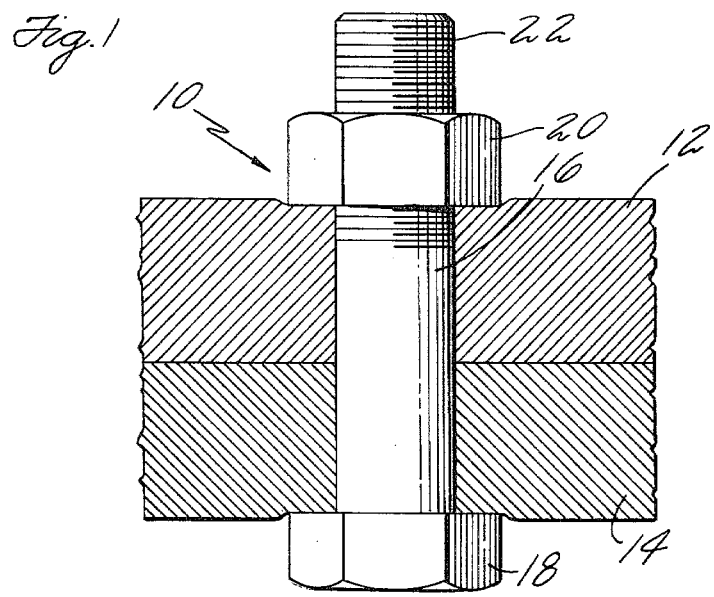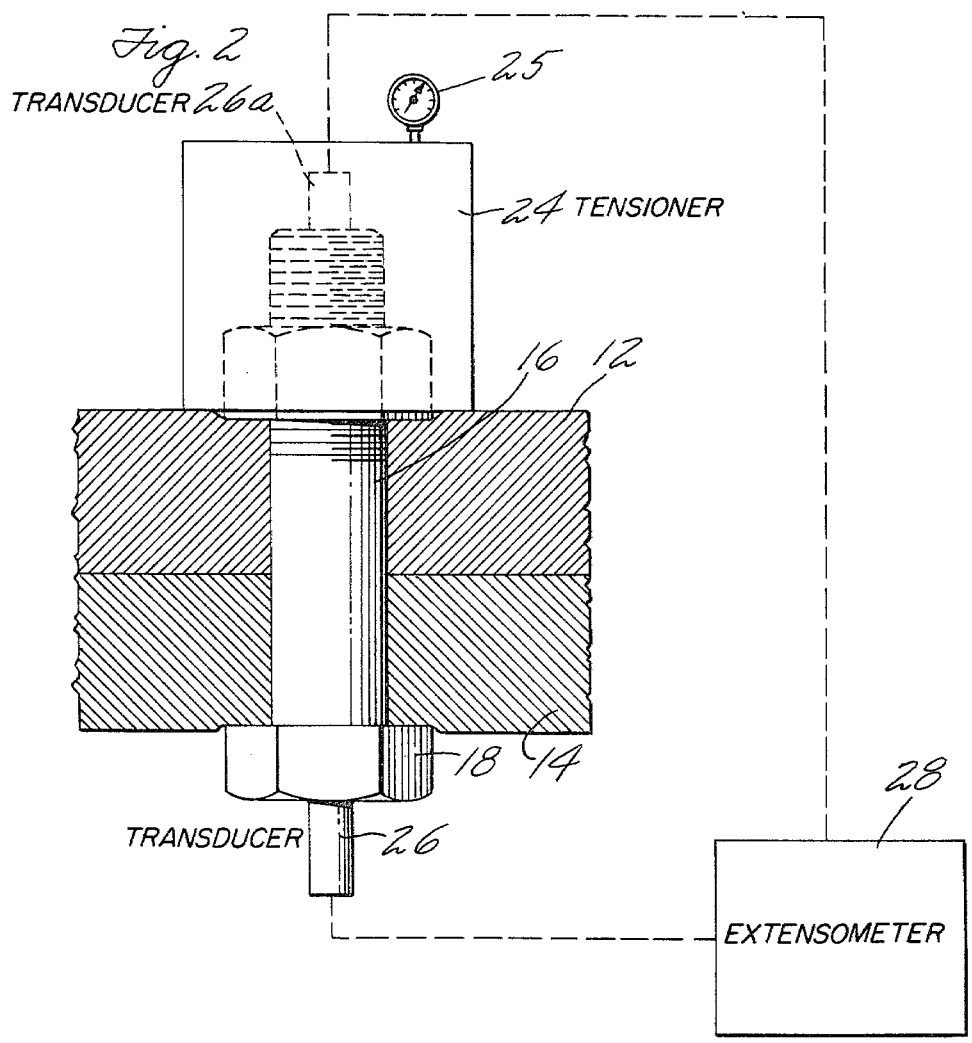

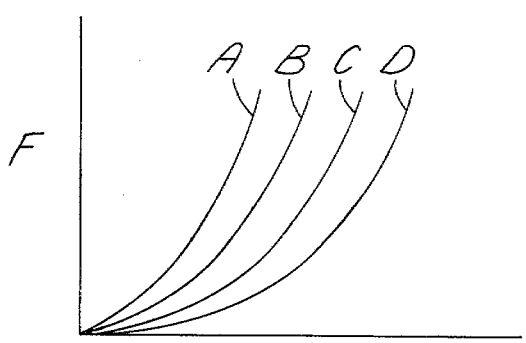
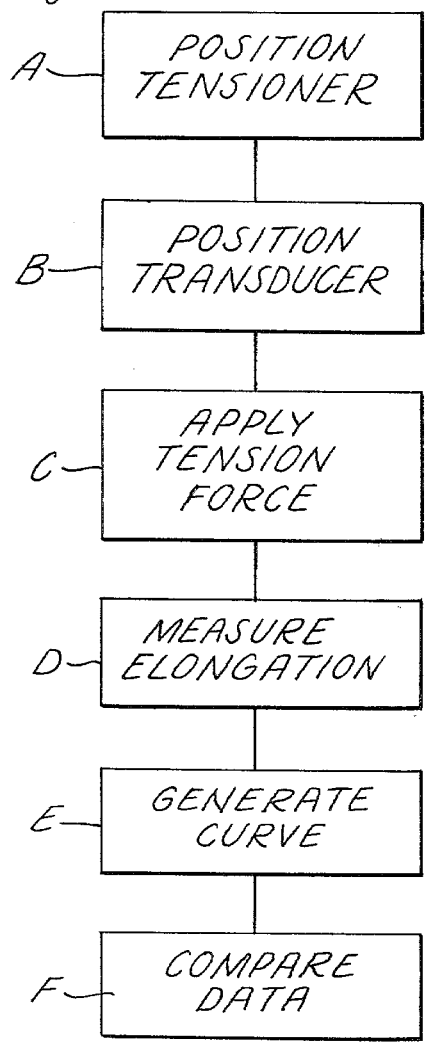
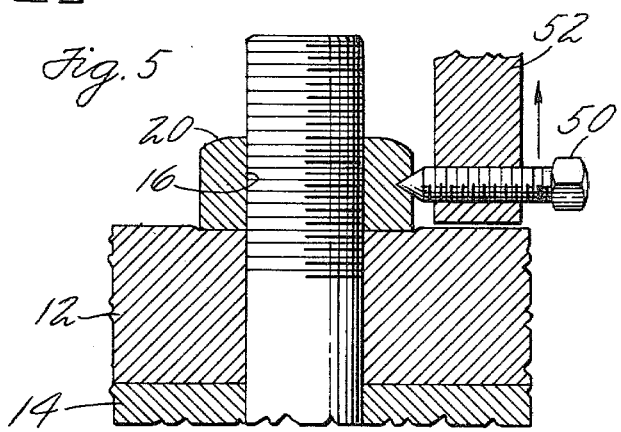
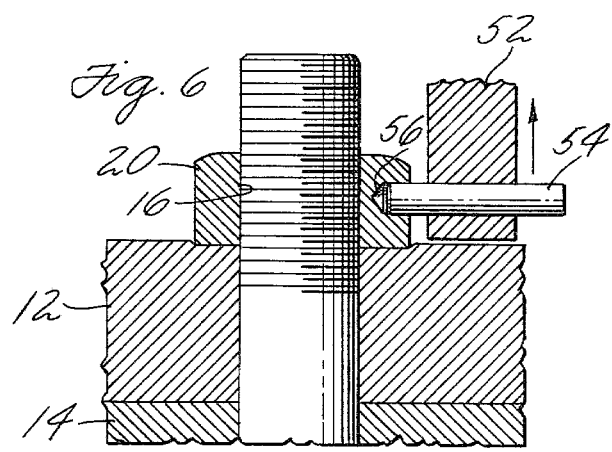

METHOD AND APPARATUS FOR MEASURING THE RESIDUAL TENSION IN A STUD OR A BOLT

BACKGROUND OF THE INVENTION

This invention relates to the field of force measurement. More particularly, this invention relates to a method and apparatus for measuring the residual tension in a bolt or stud of a previously tightened joint.

In many situations it is highly desirable to measure the residual tension in bolts or studs in a joint system. There are many instruments for imposing and measuring predetermined loads on bolts or studs of a joint when the joint is initially being assembled. These instruments include various kinds of torque wrenches with force measuring read outs such as shown in U.S. Pat. No. 3,683,686, or tensioners. Torque wrenches operate by imposing a torque load on a nut or bolt head to tighten a joint. Tensioners, such as those available from Biach Industries Inc. of Cranford, New Jersey as shown in U.S. Pat. No. 3,995,828 and other patents cited therein, operate by pulling on a bolt or stud to elongate the stud proportional to a desired tension load. The nut is then run down to butt against the flange or plate of the joint, and the tensioner is then removed.

Regardless of the way in which a joint is originally loaded, bolts or studs may lose tension over a period of time as the result of various effects, such as vibration, heat, or radiation. Since it is known that a bolt or stud will elongate in proportion to the tension load imposed on it, it is sometimes possible to obtain an indication of changes in tension by measuring the change in length of the bolt or stud. However, in many situations bolts and studs lose tension without any accompanying change in length. This is particularly so when bolts or studs are subjected to heat and/or nuclear radiation. Thus, there is a particular and important need to be able to determine the residual tension in bolts and studs in nuclear apparatus where the bolts and studs may lose tension without change in length as the result of exposure to heat and/or radiation. Unless residual tension can be determined, the integrity of the joint may be an unknown factor, a situation which could result in serious consequences in installations such as nuclear reactors.

SUMMARY OF THE INVENTION

The present invention presents a method and apparatus for determining the residual tension in a bolt or stud in a joint assembly. A tensioner is used to pull on the bolt or stud under investigation; as a result of this additional load, an additional strain, i.e., elongation, of the bolt occurs. An ultrasonic extensometer is used to measure the change in length of the bolt or stud resulting from the newly imposed tension. A force-strain curve is developed showing the relationship of the newly imposed tension to the change in length of the bolt. By comparing that generated force-strain curve to a family of previously generated force-strain curves, which constitute reference curves, the residual tension in the bolt being examined can be ascertained.

Accordingly, the principal object of the present invention is to provide a method and apparatus for determining the residual average stress in a bolt or stud of a previously tightened joint.

Other objects and advantages of the present invention will be apparent to and understood by those skilled in the art from the following detailed description and drawing.

BRIEF DESCRIPTION OF THE DRAWINGS

Referring now to the drawings:

FIG. 1 is a schematic representation of a joint to which a compressive load has previously been applied by tightening the bolt;

FIG. 2 is a schematic representation of a joint with residual stress being subjected to additional force and elongation measurement in accordance with the present invention;

FIG. 3 is a series of force-strain curves such as would be generated in the practice of the present invention;

FIG. 4 is a block diagram showing the several steps involved in the practice of the present invention; and FIGS. 5 and 6 show modified structures for use with the present invention.

DESCRIPTION OF THE PREFERRED EMBODIMENT

Referring to FIG. 1, a typical joint 10 is shown in which plates or flanges 12 and 14 are held together by a bolt 16 having a head 18 at one end and a nut 20 at the other end. Nut 20 is threaded onto bolt 16, and a top part 22 of bolt 16 projects above nut 20, the top part 22 being threaded. Assuming that joint 10 has been tightened, bolt 16 will be in tension, and plates 12 and 14 in the vicinity of the bolt will be in compression. The joint may have been tightened by a torque wrench, such as that shown in U.S. Pat. Nos. 3,683,686 and 3,745,858 or by a tensioner such as that shown in U.S. Pat. No. 3,995,828 or patents cited therein, all of which patents are incorporated herein by reference.

Assuming that a tensioner has been used to initially tighten the joint, the exposed threads 22 will be available for use in determining the residual tension in accordance with the present invention. As shown in FIG. 2, the determination of residual tension in joint 10 involves the use of a tensioner 24, an ultrasonic transducer 26 and an ultrasonic extensometer unit 28. The ultrasonic transducer 26 and ultrasonic extensometer 28 may be structures such as is shown and operated in accordance with the U.S. Pat. No. 3,759,090 which is incorporated herein by reference. To determine residual stress, the ultrasonic transducer 26 is coupled to bolt head 18, and tensioner 24 is engaged with the exposed threads on bolt end 22. The tensioner is then activated by hydraulic pressure to imposed a tensioning load on bolt 16, whereby the bolt 16 is slightly elongated, as is known in the art. Ultrasonic extensometer 28 and ultrasonic transducer 26 are energized so that ultrasonic pulses travel along the length of bolt 16 and are reflected off bolt end 22 back to transducer 26. Ultrasonic extensometer 28 measures the time differential for the pulses to travel along bolt 16 to determine the elongation of bolt 16 in the manner described in U.S. Pat. No. 3,759,090. Similarly, the increasing tension load applied to bolt 16 is monitored to be known in any desired manner, such as by a gauge 25 on the tensioner or by monitoring the hydraulic pressure actuating the tensioner. The transducer 26 is shown for convenience of illustration as being coupled to the head of the bolt opposite to the end to which the tensioner 24 is mounted. That arrangement is possible for bolts where both ends are accessible. However, in many situations, the fastener may be a stud where only the threaded end is accessible. In that situation, the transducer 26(a) would be mounted within tensioner 24 to engage the threaded end of the stud. That arrangement is shown in phantom in FIG. 2 and may be preferred so that one transducer arrangement will be suitable for all fastener configurations.

A force-strain curve is generated to relate the increasing force F applied to bolt 16 by the tensioner to the increasing length ΔL measured by extensometer 28. FIG. 3 shows several such force-strain curves labeled A, B, C and D. It will be understood that only one such curve will be generated for a particular bolt with residual tension, and the several curves shown in FIG. 3 are merely for the purpose of illustrating the fact that the curve which is generated will be determined by both the characteristics of the joint and the amount of preload. More specifically, the particular curve which will be generated will be determined by such factors as the "spring" rates of the joint components and the initial preload on the bolt, that initial preload being the quantity which is desired to be measured. More particularly, the residual preload will determine the initial slope of the generated force-strain curve. The higher the initial preload is in the joint being investigated, the lower will be the initial slope of the generated force-strain curve; and the lower the residual tension in the bolt, the higher will be the initial slope of the curve. This relationship results from the fact that the joint must be, in effect, unloaded in the vicinity of the nut before the full effect of the newly applied tensioning force is absorbed by the bolt. If a bolt has a relatively small residual load, the joint near the nut will be unloaded relatively quickly and the full effect of the new tensioning force will quickly be entirely imposed on the bolt. On the other hand, if the bolt has a high residual tension load, more of the new force will initially be absorbed in unloading the joint, and a smaller percentage of the newly applied tension will be initially absorbed by stressing the bolt. Thus, in that situation the initial slope of the curve will be lower.

Referring to the several generated force-strain curves shown in FIG. 3, the curves depict conditions of increasing residual tension from curve A through curve D, with the initial slope of the curves being progressively lower. However, it will be noted that substantially all of the new tension force becomes absorbed by the bolt after the joint is effectively unloaded, so that each curve eventually approximates a straight line, and the curves eventually become parallel.

In order to determine the initial preload from the force-strain curve generated by examining a particular joint, the generated force-strain curve must be compared to a pre-existing family of force-strain curves. This pre-existing family of force-strain curves constitutes reference data on the particular joint to determine the tension load required to unload the joint for various residual tension conditions. This reference data and these references curves may be generated by the use of strain gauges or may be estimated by calculations. The particular way in which the reference data is generated is not important, as long as the data is generated and is accurate to provide a basis for comparison of the curve which is actually generated. When the actual force-strain curve is generated, a comparison of the initial slope of the actual curve with the reference data will disclose the residual preload of the stud.

FIG. 4 depicts the several steps involved in the method of the present invention as steps A-F. Those steps are all set forth in the previous description and no further discussion should be required.

FIGS. 5 and 6 show two possible ways of employing the present invention with bolts or studs which do not have exposed end threads. If the bolt or stud was originally tightened by a hydraulic tensioner, there will be exposed threads to grab and pull with the tensioner for the practice of the present invention. However, for a joint in which a torque wrench is used to originally tighten the joint, there may be no exposed threads available to which a tensioner can be attached. In those situations, it will be necessary to provide modifications to the tensioner so that the tensioner can engage the nut to apply the new tension force. FIG. 5 shows a configuration in which a threaded clamping dog 50 extends through the body 52 of a tensioner and bites into the exterior of the nut 20 so that the tensioning force can be exerted on stud 16. Several such clamping dogs would be used in a distribution pattern around the nut 20. The clamping dogs 50 are harder than the material from which the nut 20 is made, so that the pointed ends of the clamping dog will be able to bite into and grip the nut. FIG. 6 shows a modified configuration in which dowels 54 extend through the body 52 of the tensioner and engage holes 56 spaced around the periphery of the nut. The configurations of FIGS. 5 and 6 merely illustrate two possible ways in which the tensioner can be coupled to a nut to deliver a new tensioning force to the stud 16.

As should be apparent to those skilled in the art, the apparatus and method of the present invention provides a very convenient way in which to determine residual tension in a bolt or stud without destroying the integrity of the joint. When the new force-strain curve from the new tension force is generated, the force is discontinued, the tensioner is removed, and the integrity of the joint is retained.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A method for determining the residual tension in a fastener, the method including the steps of:
   applying increasing tension forces to a fastener to elongate the fastener;
   determining the elongation of the fastener for various tension forces;
   generating a force-strain curve data to relate the increasing force applied to the fastener to the elongation of the fastener; and
   determining the residual preload of the fastener as a function of the initial slope of the generated force-strain curve data.

2. The method of claim 1 wherein:
   said step of determining residual preload includes comparing the initial slope of the generated force-strain curve data with a family of reference curve data.

3. The method of claim 1 wherein:
   the step of applying increasing tension forces to a fastener includes engaging the fastener with a tensioner and imposing a tension load on said fastener through said tensioner.

4. The method of claim 1 wherein:
   the step of determining the elongation of the fastener includes determining the elongation by ultrasonic measurement.

5. The method of claim 4 wherein:
the step of determining elongation ultrasonically includes generating ultrasonic pulses to traverse the length of said fastener, and measuring the time required for ultrasonic pulses to traverse the length of the fastener.

6. The method of claim 4 wherein:
the step of determining elongation ultrasonically includes coupling an ultrasonic transducer to one end of said fastener, generating ultrasonic pulses to traverse the length of said fastener from said one end to the other end and to be reflected back to said one end, sensing the reflected pulses at the ultrasonic transducer, and determining the time required for the ultrasonic pulses to travel from said one end to said other end and be reflected back to said one end of said fastener.

* * * * *